Sept. 24, 1929.  S. E. FINLEY  1,729,574
APPARATUS FOR PREPARING ROAD SURFACING COMPOSITIONS IN SITU
Filed Nov. 15, 1928  2 Sheets-Sheet 1
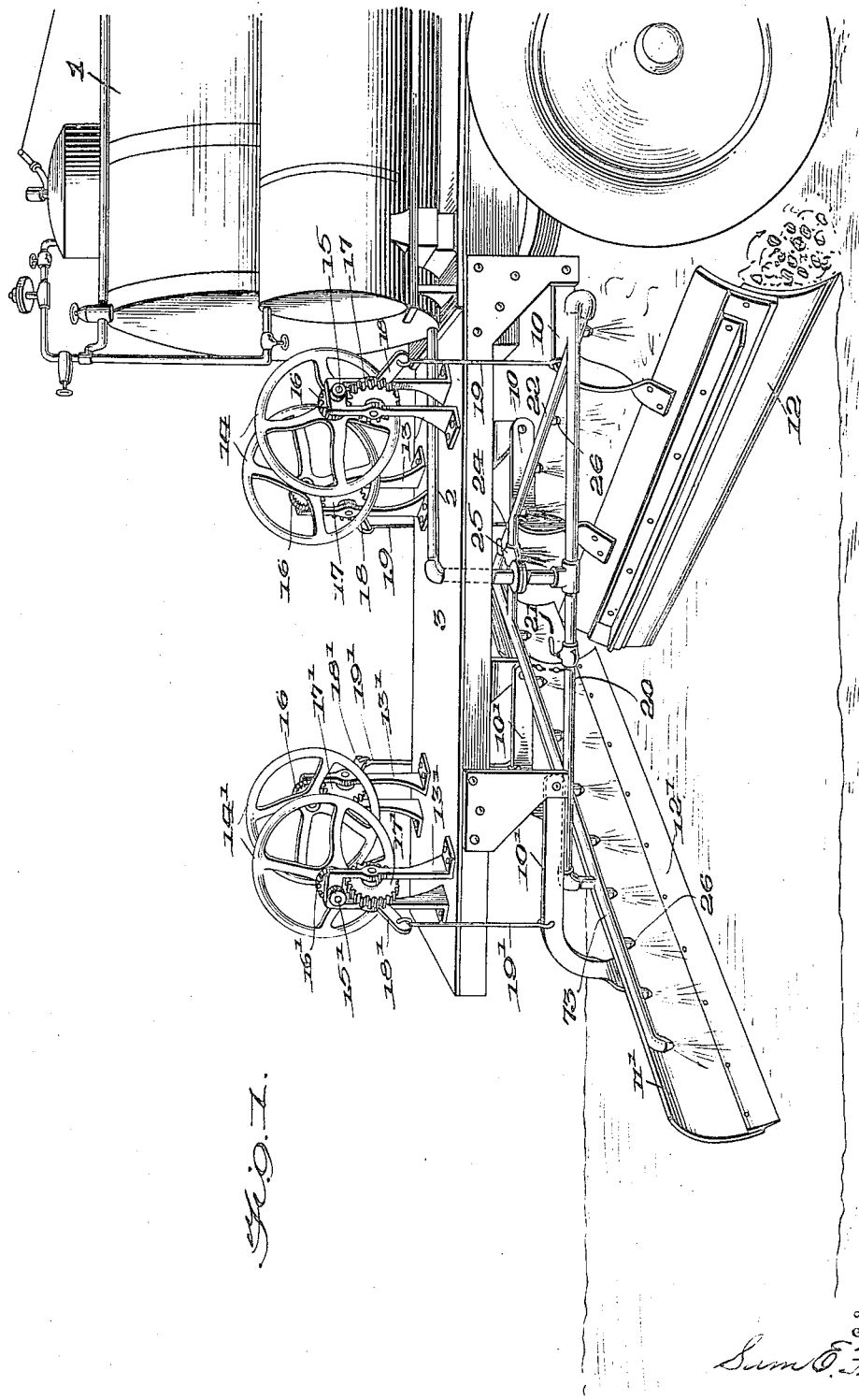

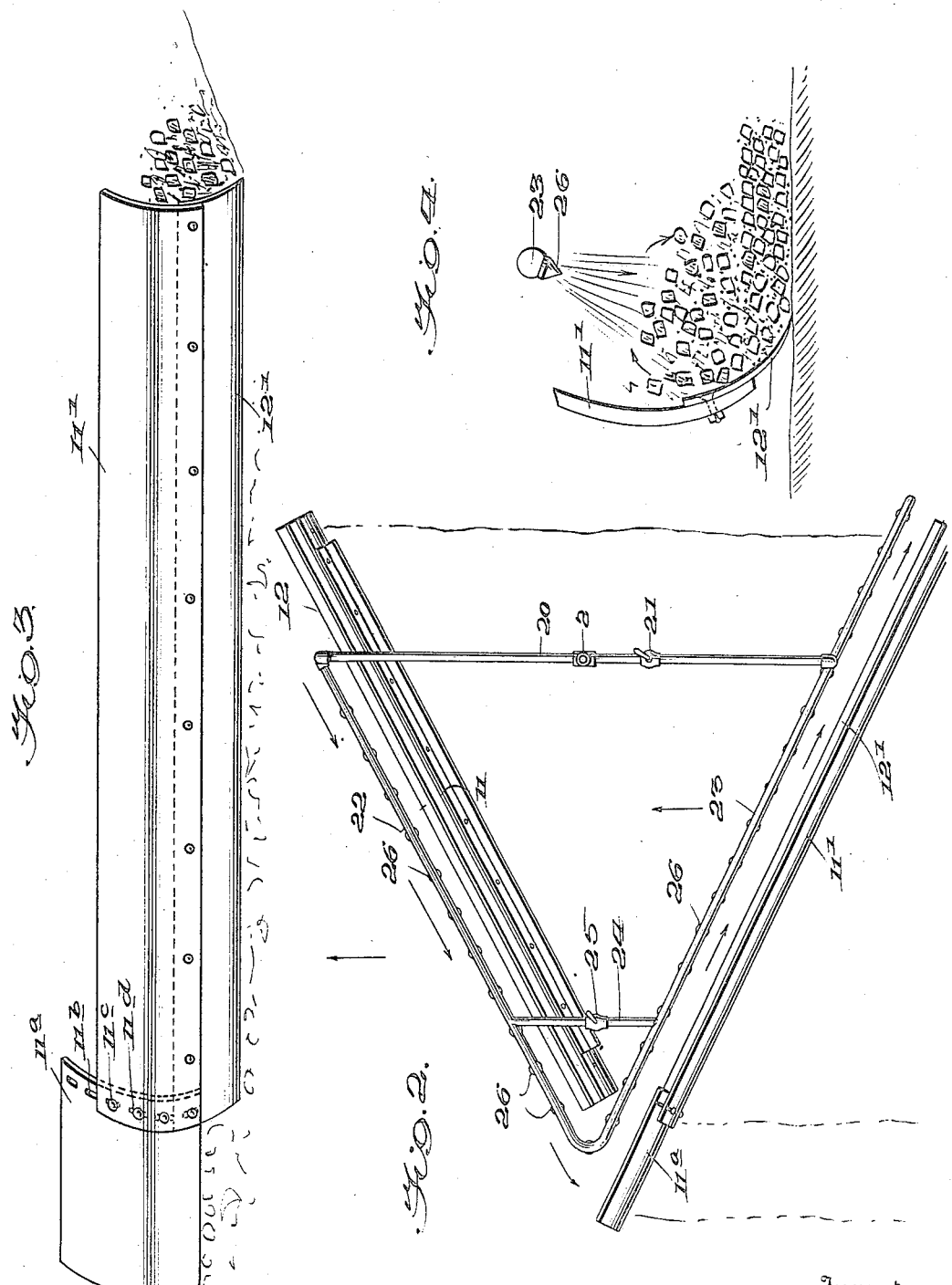

Patented Sept. 24, 1929

1,729,574

UNITED STATES PATENT OFFICE

SAM E. FINLEY, OF ATLANTA, GEORGIA

APPARATUS FOR PREPARING ROAD-SURFACING COMPOSITIONS IN SITU

Application filed November 15, 1928. Serial No. 319,556.

This invention relates to an apparatus for preparing and manufacturing, in place on road surfaces, compositions or combinations of uniformly mixed aggregate or solid material and bituminous binder, of which each element of the aggregate is completely coated with the binder, thus producing a mixture or composition which is, in effect, bituminous concrete, which, upon being laid and properly compacted, will mature into wearing surfaces of the highest stability, smoothness, durability and waterproofness.

The invention is illustrated in the accompanying drawings, in which:—

Fig. 1 is a perspective view of said apparatus associated with a tank wagon or truck, such as is commonly employed for spraying binding media on roads.

Fig. 2 is a plan view showing the preferred arrangement of the excavating and mixing blades and associated spraying means.

Fig. 3 is a perspective view of the rear blade.

Fig. 4 is an end elevation of the forward blade and spray header illustrating the action of the blade in raising and tumbling the aggregate and the spraying of the latter with the binding medium.

In a companion application filed of even date herewith, I have described and claimed a method of preparing road surfacing compositions in situ and the present application is directed to the preferred form of apparatus employed in carrying out the method.

Referring to the drawings, 1 indicates a tank vehicle for containing the binding medium, usually in the form of either a bituminous cement containing a hydrocarbon cutback or liquefier, or a highly heated bitumen, to be distributed upon and admixed with the aggregate or solid material, the vehicle preferably being of the type illustrated in my prior Patent No. 1,397,045 dated November 15, 1921, from which the manifold or distributor bar has been removed and replaced by a special form of distributor or spray bar, to be hereinafter described, and which is connected to the tank by a pipe 2.

Secured to and forming a rearward extension of the chassis frame of the vehicle is a platform 3, from which is adjustably suspended a special arrangement of scrapers or blades, associated with the mechanism for spraying the binding medium onto the aggregate or solid material, while the latter is being operated upon by the scrapers in the manner and form hereinafter described.

Pivoted to the framework or platform 3 are two angular arms 10, 10, to the lower ends of which is rigidly secured a scraper or blade 11 having a detachable and renewable cutter element 12 fastened to its lower portion, the blade as a whole being curved downwardly and forwardly and being disposed transversely of the longitudinal axis of the vehicle and at an angle of approximately 30° to said axis. Each of the arms 10, 10 is connected to operating mechanism mounted on the top of the platform 3, so that these arms may be raised and lowered independently to properly adjust the cutting edge of the blade 11 with respect to the road surface over which the tank vehicle travels. This adjusting mechanism may be of any of the preferred forms commonly employed in adjusting the blades of road scrapers or drags and, as illustrated, each adjusting device comprises a pedestal 13 fastened to the top of the platform 3, in the upper part of which is mounted a stub shaft 15 carrying a worm 16 secured to a hand wheel 14, the worm engaging a worm wheel 17 journaled in the pedestal 13 and having secured to one of its faces a lever arm 18, the outer end of which is connected by a link 19 to the corresponding pivoted arm 10. It will be apparent that, by operating the hand wheels 14, the blade 11 may be raised and lowered to a uniform extent throughout its length, with respect to the road surface, or either end of the blade may be elevated relative to the other, in practically the same manner as a standard road scraper or drag.

To the rear of the blade 11, there is mounted a generally similar blade 11', which is swung below the platform 3 by arms 10', 10' pivoted to the frame of the platform, said blade 11' being disposed at an angle of substantially 30° to the longitudinal axis of the vehicle and at an angle of approximately 60° to the longitudinal axis of blade 11, the relation of the blades being clearly indicated in Figs. 1 and 2. The blade 11' is provided with a removable plate 12' at its lower edge to permit said plate being replaced, when it becomes worn or damaged. The end of the blade 11' nearest to the blade 11 is provided with an adjustable section 11ª, which may be raised and lowered by means of registering bolt holes 11ᵇ and 11ᵈ and bolts 11ᶜ, as indicated in Fig. 3. The purpose of this adjustable end section 11ª is to direct the material discharged from the end of blade 11 into engagement with the rear blade 11', the section 11ª being secured to the end of the blade 11', so that the lower edge of said section will clear the surface of the road outside the line of action of the scrapers.

The adjustment of the blade 11' relative to the road surface is effected by means similar to those employed in connection with blade 11, each of the arms 10' being connected by a link 19' with a lever 18' secured to a worm wheel 17' journaled in a pedestal 13' and actuated by a worm 16' on a stub shaft 15', which carries a hand wheel 14'. As the adjusting means for the respective ends of the blade 11' are independent, it will be apparent that said blade 11' may be adjusted to correspond with the adjustment of the forward blade 11.

Mounted in front of each of the blades 11 and 11' and parallel with the latter are spray bars 22 and 23 provided with spaced spray nozzles 26, which direct the sprays of binding medium downwardly and rearwardly toward the faces of the respective blades. The spray bars are connected to the discharge pipe 2 leading to the tank containing the heated bitumen. As a matter of convenience, the spray bars 22 and 23 are connected by cross pipes 20 and 24, each supplied with a valve 21 and 25, respectively, and are also connected at their converging ends so as to equalize the distribution of the bitumen delivered by the pipe 2 to the respective spray bars 22 and 23.

The operation of the apparatus, as described, is as follows: The forward blade 11 is adjusted so that its lower cutting edge penetrates to the desired depth in the material forming the surface of the road, so that the blade will excavate, raise and tumble the solid material of the road surface in a loose rolling mass that is moved or advanced longitudinally of the blade and continuously discharged from the rearwardly inclined edge of said blade and, while the solid material from the road surface is being thus raised and tumbled, it is sprayed with the binding medium by the nozzles 26 of the spray bar 22, so that all of the faces of the loose, tumbling aggregate or solid material will be coated with the binding medium. The rear blade 11' is adjusted so that its lower edge is parallel with the lower edge of blade 11, so that said blade 11' receiving the road material discharged from the end of blade 11 will continue the lifting and tumbling operation on the loose material and advance the latter transversely of the roadway in the reverse direction, as compared with the transverse movement imparted to the material by the blade 11. During this continued tumbling and lateral advance of the material, it is further sprayed with bitumen from the nozzles 26 of the spray header section 23, so that, when the road material is ultimately discharged from the end of blade 11' in the form of a windrow, it will consist of an intimate and uniform admixture of aggregate and binding media, the latter completely coating all of the elements of the aggregate or solid material and forming with the solid material an admixture of such proportions that, when the coated aggregate is spread upon the road and compacted, it will constitute a bituminous concrete wearing surface for the road.

The method is particularly adapted to the manufacture or production of road surfacing compositions in which the solid constituents are taken from the road surface and form the wearing surface of the old road. The method is especially adapted to surfacing roadways which have been constructed of such material as gravel, clay-gravel, sand-clay, sand-gravel, chert, top soil, macadam, shell, or other similar forms or combinations of inorganic material, generally designated as aggregate. Such roadways contain, within their structure, some or all of the aggregate required to produce the desired result under the present method. The method is susceptible of scientific, accurate and definite application in producing a properly balanced admixture of aggregate and binding medium, because prior to the manufacture or formation of the composition directly at the place of use of the latter, a careful screen analysis is made of the material in the roadway and, if it is found deficient in any desired size or quality of aggregate, this deficiency is remedied by adding the desired material before mixing with the bitumen. Also the proper quality, grade and quantity of the binding medium best suited to the particular form of the aggregate is determined by engineering practice and experience and the delivery of the binding medium to the aggregate regulated accordingly.

It will be noted that not only the entire mass of aggregate in front of the forward blade 11 will be lifted, rotated and tumbled, but that each particle in the mass is also rotated and is individually exposed, ultimately, to direct contact with the spray of bitumen until, as the action is continued a sufficient length of time, every particle will be fully coated on all sides. It will also be understood that, due to the angularity of the axis of the blade to the center line of the roadway, the mass in front of the blade will gradually travel along the face of that blade in breaking whorls beginning at the outer end of the blade and continuing until contact with the blade 11 is lost at the rear end of the latter, the rotation of the mass being in a clockwise direction and at the discharge end of the blade the material is delivered to the second or rear blade where the operation is repeated, but that the direction of rotation of the mass and the individual particles is reversed or anti-clockwise and the progression of the mass by the rearward inclination of the blade is in a reverse direction across the line of travel of the machine. At the discharge end of the forward blade 11, the material is delivered in a windrow and much of the material therein would escape the second or rear blade, but for the auxiliary section or extension 11$^a$ on the latter, which is adjusted to a proper height to clear the adjacent section of the road which is not affected by the blades, so that said auxiliary section will deliver the entire body of mixed material discharged from the front blade to the rear blade without gathering any new material from the roadway lying below the extension.

To illustrate the use of this method on a given type of roadway consider a gravel roadway which has ravelled or scoured off at the surface and which it is desired to replace with a bituminous concrete wearing surface. The cause of the deterioration of the original road surface is largely due to the removal of the fine binding material by traffic and weather conditions, including wind and rain. Suppose that an analysis of the aggregate on the surface of the road before treatment discloses 70% of aggregate will pass a 1″ screen and be retained on a ¼″ screen and that the remaining 30% will pass through a ¼″ screen and will be retained on a 10 mesh screen. This combination of aggregate is deficient in fine material, if the toughest and most wear resisting paving surface is to result from the application of the present method. This deficiency may be made up by adding approximately enough fine aggregate, such as sand and impalpable powder, so that the resulting mass will contain 45% to 60% of the material coarser than ¼″; 25% to 40% of material between ¼″ and that which will pass a 200 mesh screen; and 3% to 5% of material fine enough to pass a 200 mesh screen. After adding this new material to that already upon the roadway, the whole is bladed, raised and tumbled by the operation of the successive blades until a substantial uniformity of distribution of the various sizes of the solid material throughout the mass is effected, and each individual particle or element of the solid material is thoroughly and completely coated with the binding medium. By means of similar analyses and syntheses, any standard mixture of aggregates may be produced with accuracy, the manner of making such analyses and determining the quantity and character of aggregate and binding medium to add to produce the desired mix is a simple problem of calculation familiar to engineers and operatives skilled in the art of producing asphaltic concrete pavements or roadways.

As stated hereinbefore, this method is especially adapted to surfacing roadways which furnish within themselves some or all of the desired aggregate, but it is not confined to the treatment of such roadways, as it may be used to advantage in the production of all types of pavements in which a complete coating of the aggregate at the place of application to the roadway is desirable. Consider, under this type, an asphalt macadam road to be treated according to the present method. Asphalt macadam is constructed of alternate layers of stone and asphalt, the coarser layer of stone at the bottom, and with each successive layer composed of finer aggregate. Under the prior method of constructing this type of roadway, the first or lower layer of such stone is usually between 2″ to 2½″ in diameter. This layer is spread dry and uncoated to a depth of 2″ to 3″ and then coated from above with asphalt. During this coating process, the stones do not move and the asphalt penetrates only for a certain depth of the stone course. After the application of the asphalt coating, one-half inch stone is cast over the coated surface of the larger stone and rolled in. It will be readily seen that such coarse stone, to which the asphalt is applied from above by the usual penetration method, cannot be fully coated with asphalt and it is common knowledge that many of these stones are not coated at all, particularly those in the lower portion of the course, that many are only partly coated and that none of them are completely coated with the asphalt, so that a complete asphaltic binding of the aggregate throughout the course is impossible of realization. This deficiency of the asphaltic bond has been the primary cause of the disintegration of bituminous or asphaltic macadam roadways under the stresses of traffic and weather and constructing engineers are constantly struggling to effect the better distribution of the binding medium throughout the aggregate and thereby increase the cementitious bond among the elements of the aggregate as far as possible, so that the disintegration of the wearing surface of the road will be reduced to a minimum. However, the inability of the penetration method to secure a coating and cementing of all of the elements of the aggregate, even under the most careful modes of application of the binding medium heretofore available, leaves much to be desired in the matter of inherent strength and wear and weather resisting qualities in roads of this type. By the method of the present invention, however, all the aggregate or solid elements of the road are completely coated with the binding medium, the various sizes of the aggregate are uniformly distributed throughout the mass, and, when the resulting mixture or composition is applied to the road surface and properly compacted, practically all of the voids in the aggregate are filled with the binding material, which cements the elements of the aggregate together into a substantially homogeneous mass.

It is well known that, when loose aggregate is spread upon a road site, there is a tendency of the aggregate to stratify or segregate according to the various sizes employed, as the material is cast and worked into place and this condition of segregation according to size is prevalent in practically all of the old types of roads hereinbefore referred to and is one of the outstanding objections of these roads, because the fine material scours off under the wheels of traffic or is washed away by water or blown away by the wind, so that the road loses the mechanical bonding effect of this lost fine material. The method involved in the present invention obviates this difficulty, in that it gathers the aggregate from the the old road surface and remixes it to substantial uniformity of distribution of the various elements, with or without the addition of further aggregate, as circumstances may require, before the entire quantity of binding medium necessary to effect the ultimate cementitious bond is applied. The essential novelty of the invention, in so far as the method is concerned, resides in the simultaneous raising, tumbling and rotating of a mass of aggregate taken from the road surface and advanced laterally with respect to said surface and spraying the tumbling and laterally moving body of aggregate with a bituminous binding medium during the multifarious movements of the mass and the individual elements thereof until all of said elements are completely coated with the bitumen and enough of the latter is supplied to the aggregate to produce a concrete mixture in which all of the solid elements are effectively bonded and are uniformly distributed throughout the mixture or composition, so that the latter is in ideal condition to be spread upon the road and compacted by rolling or equivalent operations into a firm, self-sustaining, wear resisting and weatherproof road surface. In addition to the advantages hereinbefore enumerated, the method results in a better product at a lower cost than is possible of attainment with the same materials applied by the methods hereinbefore in vogue, more particularly the central plant mix in which the ingredients are incorporated into the composition by expensive machinery and heavy labor cost and transported through varying distances to the place of application, and the straight penetration method in which the coarser aggregate is first spread upon the roadway, worked to proper grade and contour and then sprayed with the binding medium delivered by a tank vehicle or equivalent distributing aparatus. Engineers have long since considered it impossible, although desirable, to produce completely coated mixtures of aggregate by penetration methods, therefore they have generally considered that plant mixed asphaltic concrete pavements are superior to those produced by the penetration methods. The practice of applicant's method, however, as hereinbefore described, removes the plain cause of this preference and by the application of this new penetration method produces a type of asphaltic concrete, which, when laid and matured, is equal to plant mixed pavements in all points of comparison and is superior to the latter in the matter of stability.

While the invention has been described with particular reference to the utilization of the aggregate or solid material from road surfaces, it will be understood that both the method and apparatus find an especially efficacious application to the preparation of new bituminous concrete mixtures in place. This application of the invention involves the dumping or spreading of the mineral aggregate, in suitable form, onto the road surface and then lifting, tumbling and spraying the aggregate with the binding medium, as hereinbefore described, until all of the elements of the aggregate are completely coated with the binding medium and the resultant mixture of aggregate and binding medium is comparable to the bituminous concrete produced by the standard hot-mix methods in central plants, the instant invention, however, producing these desirable results at a great saving in cost, particularly of labor and time.

While the invention is not limited to any particular type or condution of bituminous binding medium, in many cases, it will be found advantageous to employ a bituminous cement containing a hydrocarbon cut-back or liquefier, which is more or less volatile, so that the entire operation may be carried out with relatively cold materials, thereby avoiding the necessity of heating the binding medium at a central plant and transporting the same in tank wagons to the place of application.

What I claim is:

1. A machine for preparing road surfacing compositions of aggregate and bituminous binder, comprising means to be drawn over the road to penetrate and break up the surface course thereof to a predetermined depth and to raise, agitate and tumble the aggregate elements and move the same transversely of the direction of movement of said means over the road; and means to simultaneously spray bitumen onto the moving aggregate and coat all of the individual elements of the latter.

2. A machine for preparing road surfacing compositions of aggregate and bituminous binder, comprising an elongated blade supported to be drawn over a road to penetrate and break up the surface course thereof to a predetermined depth, said blade having a concave working face and a horizontal inclination to its direction of travel adapted to raise, agitate and tumble the aggregate elements and move the same transversely of the direction of movement of said blade over the road, multiple spray nozzles in advance of the blade to deliver bitumen onto the moving aggregate to coat all of the individual elements of the latter; and means to supply bitumen to said nozzles.

3. A machine for preparing road surfacing compositions of aggregate and bituminous binder, comprising an elongated blade supported to be drawn over a road to penetrate and break up the surface course thereof to a predetermined depth, said blade having a concave working face and a horizontal inclination to its direction of travel adapted to raise, rotate and tumble the solid material and move the same transversely of the direction of movement of the blade, and a second similar blade in the rear of the first blade having a reverse horizontal inclination adapted to receive the material discharged from the first blade and continue the tumbling and transverse movement of the material in a reverse direction; a series of spray nozzles in advance of each blade to deliver bitumen onto the moving aggregate; and means to supply bitumen to said nozzles.

4. A machine for preparing road surfacing compositions of aggregate and bituminous binder, comprising a frame supported on a wheeled vehicle, front and rear trough-shaped blades supported in following relation from said frame and disposed in horizontal angular relation to the direction of movement and to each other, whereby the material discharged from the front blade will be received by the rear blade, nozzled headers disposed parallel with and in advance of said blade, and means for supplying a bituminous binder to said headers.

5. A machine for preparing road surfacing compositions of aggregate and bituminous binder, comprising a frame supported on a wheeled vehicle, front and rear trough-shaped blades supported in following relation from said frame and disposed in horizontal angular relation to the direction of movement and to each other, whereby the material discharged from the front blade will be received by the rear blade, means for adjusting said blades vertically with respect to the road surface, nozzled headers disposed parallel with and in advance of said blade, and means for supplying a bituminous binder to said headers.

6. A machine for preparing road surfacing compositions of aggregate and bituminous binder, comprising a frame supported on a wheeled vehicle, front and rear trough-shaped blades supported in following relation from said frame and disposed in horizontal angular relation to the direction of movement and to each other, whereby the material discharged from the front blade will be received by the rear blade, means for adjusting said blades vertically with respect to the road surface, a vertically adjustable section secured to the end of the rear blade adjacent the discharge end of the front blade, nozzled headers disposed parallel with and in advance of said blade, and means for supplying a bituminous binder to said headers.

7. A machine for preparing road surfacing compositions of aggregate and bituminous binder, comprising a frame supported to be drawn above the road to be treated, a front horizontal concave-faced blade supported from said frame at an angle to the direction of movement of said frame, a similar rear blade supported from said frame and disposed in horizontal angular relation to the front blade, said blades operating to raise, tumble and shift the aggregate mass transversely and alternately of the line of movement of said frame, a series of spray nozzles in advance of each blade to deliver sprays of the binder onto the tumbling and shifting aggregate, and means to supply the binder to said nozzles.

In testimony whereof I affix my signature.
SAM E. FINLEY.